July 21, 1925.
J. J. BAUSCH
1,547,142
LENS FRAME
Filed Feb. 6, 1923
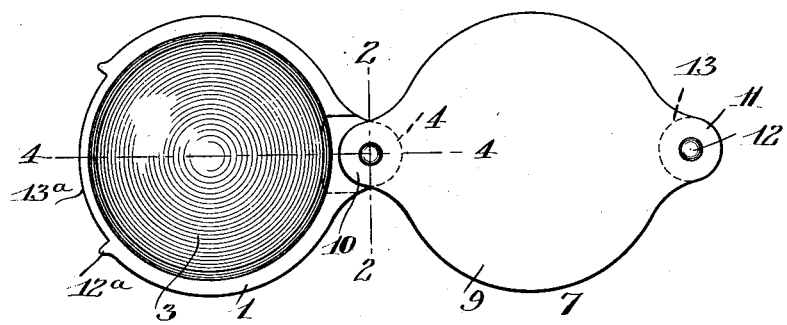
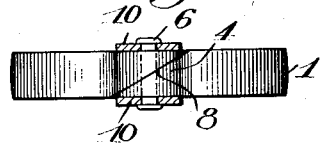
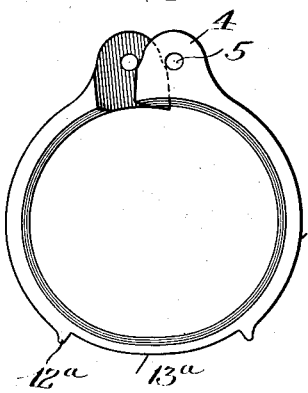
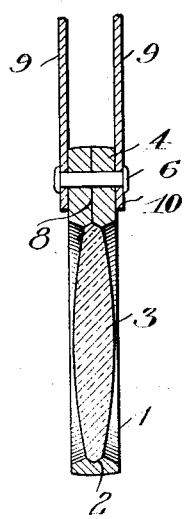
INVENTOR.
John J. Bausch
BY
his ATTORNEY Patented July 21, 1925.

1,547,142

UNITED STATES PATENT OFFICE.

JOHN J. BAUSCH, OF ROCHESTER, NEW YORK, ASSIGNOR TO BAUSCH & LOMB OPTICAL COMPANY, OF ROCHESTER, NEW YORK, A CORPORATION OF NEW YORK.

LENS FRAME.

Application filed February 6, 1923. Serial No. 617,366.

*To all whom it may concern:*

Be it known that I, JOHN J. BAUSCH, a citizen of the United States, residing at Rochester, in the county of Monroe and State of New York, have invented certain new and useful Improvements in Lens Frames; and I do hereby declare the following to be a full, clear, and exact description of the same, reference being had to the accompanying drawings, forming a part of this specification, and to the reference numerals marked thereon.

My present invention relates to optics and more particularly to lenses and their mountings and it has for its object to provide a neat, secure and attractive lens frame that may be economically manufactured with few parts and these easily assembled. A further object of the invention is to provide for securing the frame to an attached element without the use of additional parts by utilizing as a securing means the device that holds the frame to the lens. To these and other ends the invention resides in certain improvements and combinations of parts all as will be hereinafter more fully described, the novel features being pointed out in the claims at the end of the specification.

In the drawings;

Figure 1 is a plan view of a lens frame and case constructed in accordance with and illustrating one embodiment of my invention.

Figure 2 is a side view of the frame partly in section through the case on the line 2—2 of Figure 1.

Figure 3 is a plan view of the frame detached and with the lens removed.

Figure 4 is a section partly broken away on the line 4—4 of Figure 1 and

Figure 5 is an edge view of the frame alone in the condition shown in Figure 3.

Similar reference numerals throughout the several views indicate the same parts.

Features of my invention are applicable to lens frames in general but I have illustrated in the present instance the said invention as applied to a small magnifier of the type designed to be carried in the vest pocket and embodying a case to protect the lens when folded and which, when the lens is extended acts as a handle. Referring more particularly to the drawings 1 indicates an annular or ring like frame of suitable design provided interiorly with a grooved lens seat 2 in which the double beveled edge of the lens 3 is received. A lug 4 at one side of the ring or frame has an aperture 5 extending therethrough to receive a riveted or otherwise secured pivot pin 6 by means of which the lens frame is movably attached to its case 7. The ring 1 is split at 8 in a diagonal plane forming an acute angle with the general plane of the lens frame as clearly shown in Figure 2 and the free ends, thus produced, each carry a part of the lug 4 through which the plane of cleavage passes and part of the aperture 5. In assembling, the ring is expanded to the position of Figure 3 in greater or less degree carrying the portions of the aperture 5 out of alignment but admitting the lens easily to its seat 2. The free ends are then pressed together and, in resuming its normal annular shape, the frame grips the lens and holds it tightly. The portions of the aperture 5 have now been restored to alignment and when the pin 6 is inserted it not only provides the pivot hereinbefore mentioned but holds the frame together in gripping engagement with the lens.

The case 7 in the present instance embodies two cheek pieces or plates 9 having lugs 10 corresponding in confirmation to the lug 4 of the plane and receiving pivot pin 6 of the latter. At the opposite ends of the cheek pieces are similar lugs 11 suitably secured together by a pin 12 passing through them and through a spacing member 13 indicated in dotted lines in Figure 1 which holds the cheeks at that end in spaced parallelism equal to the thickness of the lens frame 1. When the magnifier is not in use it is folded on the pivot 6 into the case 7 in the well known manner in which condition lugs 12$^a$ on the frame project slightly beyond the cheeks of the case at either side and form a grip for the fingers in withdrawing the lens frame from the case. These lugs are preferably formed as shown by reducing in thickness a segmental portion 13$^a$ of the frame opposite the lug 4 whereby the frame is given greater flexibility at this point and lends itself better to the expanding action.

I claim as my invention:

1. The combination with a lens frame having a lens seat and a split portion divided at an acute angle to the plane of the frame and permitting the frame to expand to admit the lens to its seat, of a case for the frame and a pivot member connecting the case with the frame and also constituting means for securing together the ends of the split portion of the frame.

2. The combination with a lens frame having a lens seat and a split portion divided at an acute angle to the plane of the frame permitting the latter to expand to admit the lens, of a member pivotally connected to the frame, the pivot thereof extending through the ends of the split portion of the frame in a direction normal to the plane of the latter and acting to secure said ends together.

3. The combination with a lens frame having a lens seat, said frame being spilt at an acute angle to the plane of the frame to permit the latter to expand to admit the lens of a pin extending through the ends of the split portion at right angles to the plane of the frame and acting to secure said ends together and to secure the frame about the lens.

4. The combination with a lens frame having a lens seat and a split portion divided at an acute angle to the plane of the frame, of a case embodying cheek plates between which the frame is adapted to fold and a pivot connecting the frame and case and extending through the ends of the split portion of the frame at right angles to the plane of the latter to secure said ends together and clamp the frame about the lens.

5. The combination with a lens frame having a lens seat and a spilt portion divided at an acute angle to the plane of the frame said frame having a reduced segmental portion opposite said split portion terminating in outwardly projecting lugs, a casing for the frame and means for securing said split portions and said casing and permitting a swinging movement of one upon the other.

JOHN J. BAUSCH.